Figure 1:
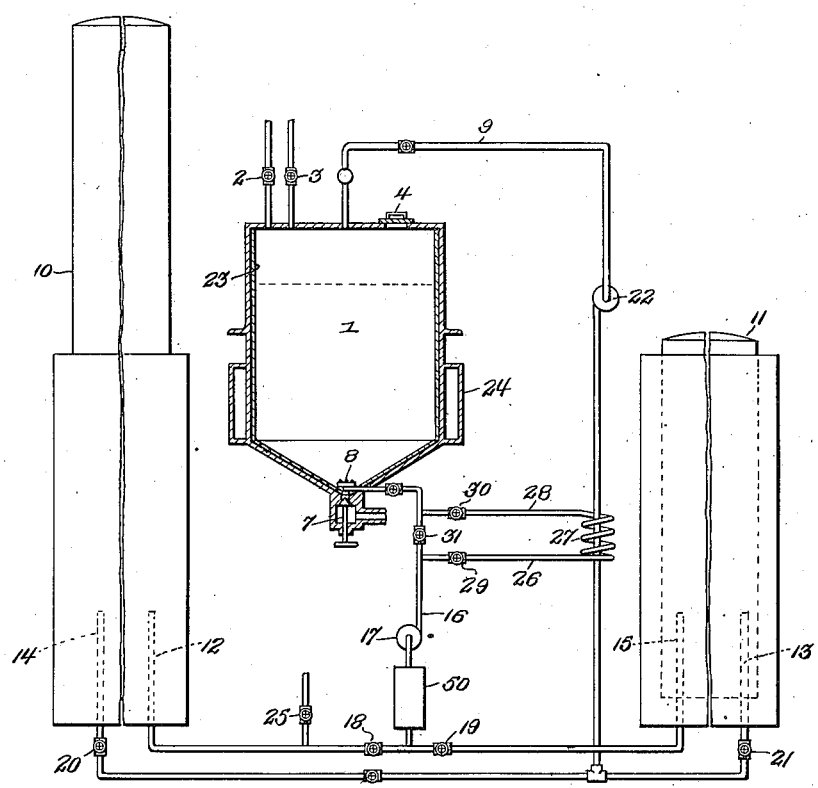

C. ELLIS.
PROCESS AND APPARATUS FOR TREATING OILY MATERIAL.
APPLICATION FILED MAY 2, 1917.

1,247,095.

Patented Nov. 20, 1917.

C. ELLIS.
PROCESS AND APPARATUS FOR TREATING OILY MATERIAL.
APPLICATION FILED MAY 2, 1917.

1,247,095.

Patented Nov. 20, 1917.
2 SHEETS—SHEET 2.

Witness
J. H. Crawford

Inventor
Carleton Ellis
By
A. B. Foster Attorney

UNITED STATES PATENT OFFICE.

CARLETON ELLIS, OF MONTCLAIR, NEW JERSEY.

PROCESS AND APPARATUS FOR TREATING OILY MATERIAL.

1,247,095.

Specification of Letters Patent.

Patented Nov. 20, 1917.

Application filed May 2, 1917. Serial No. 165,974.

*To all whom it may concern:*

Be it known that I, CARLETON ELLIS, a citizen of the United States, residing at Montclair, in the county of Essex and State of New Jersey, have invented certain new and useful Improvements in Processes and Apparatus for Treating Oily Material, of which the following is a specification.

This invention relates to a process of treating unsaturated oils with hydrogen or other gases, and relates in particular to the treatment of oily material with hydrogen or a hydrogen-containing gas involving passing preferably a large body of gas through a relatively small body of oil, in collecting the unabsorbed gas and in repeatedly passing the same through the oily material until reaction has been effected to the desired extent. The invention also includes the apparatus in which such treatment may be carried out.

By reference to the accompanying diagrammatic drawings it will be seen in what manner the process of my invention may be carried out.

The drawings show in sectional elevation a treating tank or chamber with gas holders in elevation and with various connections between said tanks and said holders.

Like reference characters indicate like parts throughout.

Figure 2:
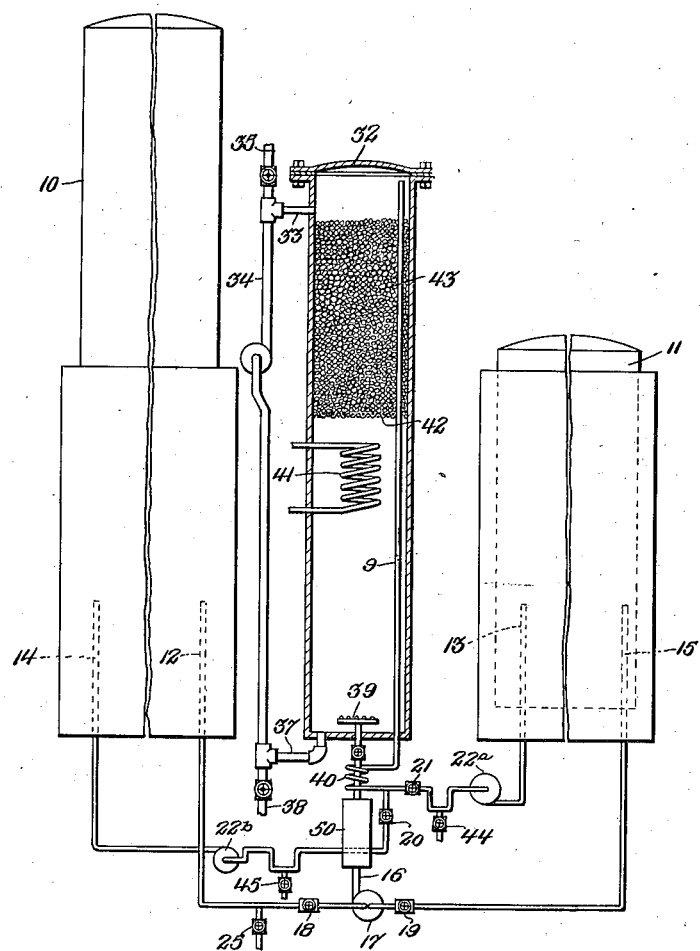

In Figure 1 a conical-bottomed tank of considerable depth with reference to width is depicted; while in Fig. 2, a tank of substantially cylindrical shape is shown.

1 is a tank having the oil inlet 2, exhaust pipe 3 (which may be kept closed during the entire process, or which may be opened particularly during the first part of the treatment, if desired) and man-hole 4. 7 is a draw off valve. 8 is a gas inlet nozzle connected to a rose or the like. 9 is an outlet pipe connected with the top of the tank 1, in which pipe is interposed the pump 22. This pipe communicates with the gas holders 10 and 11 by the uprisers 13 and 14. The pipe 16 in which is interposed the pump 17 communicates with the nozzle 8. The pipe 16 also communicates with the gas holders 10 and 11 by means of the uprisers 12 and 15.

The tank 1 may have a suitable lining 23. A heating jacket is provided at 24. A heat interchanger or recuperator may be provided as shown at 27 and is connected with the pipe 16 by the pipes 26 and 28. 25 is a gas inlet. 18, 19, 20, 21, 29, 30 and 31 are valves.

In the operation of this apparatus oil is admitted to the tank by pipe 2 to fill same one-half to two-thirds full, or thereabout for example to the dotted line in Fig. 1. Catalyzer is introduced in a suitable manner, *e. g.* by pipe 2 and hydrogen is entered by the pipe which is shown provided with the valve 25 to fill one of the gas holders, 10 or 11 (*e. g.* the holder 10). The valves 19, 20 and 25 may then be closed and the valves 18 and 21 opened. The pumps 17 and 22 are then put in operation and hydrogen forced from the gasometer 10 into the gasometer 11, by the way of the tank 1, so that the gas bubbles through the oil contained in said tank. This operation may be continued until substantially all, or any desired proportion of the hydrogen has been passed through the said oil. Valves 19 and 20 are then opened and 18 and 21 closed, the pumps 17 and 22 being worked as before.

By closing the valve 31 and opening the valves 29 and 30, the hydrogen entering the tank may be preheated at the expense of the hydrogen leaving the tank and this heat interchange enables the process of hydrogenation to be considerably accelerated. This interchange of heat greatly facilitates the hydrogenation process.

When the oil has been treated to the desired extent, the oil is drawn off by valve 7, and the oil and catalyzer separated in any suitable manner.

In Fig. 2, 1 is a treating tank or tower. Gas holders 10 and 11 are arranged as shown in Fig. 1. The hydrogen-return pipe 9 passes down through the tower and forms a heat interchanger at 40. Hydrogen or other suitable gas is admitted by the distributer 39. From the bottom of the tank a draw-off pipe 37 communicates with the outlet 38. 36 is an oil pump interposed in the pipe 34 which connects with the upper part of the tower by the pipe 33. 35 is an oil or catalyzer inlet. 41 is a steam coil.

The operation in accordance with the apparatus of Fig. 2 is as follows: The tank is charged with the oil to fill it to a point just below the top of the pipe 9. The bed of catalyzer 43 is placed on a porous screen 42. This catalyzer may consist of nickelized pumice or any other suitable catalytic material, it being preferably of a coarse or granular or porous nature, in order that the oil may flow through it freely.

The oil is heated by the steam coil 41 and is caused to circulate in the tower drawn from the bottom and fed into the top of the tower, preferably in a substantially continuous manner. In passing through the catalyzer 43, very fine particles of the catalytic material are to some extent detached from the porous bed. Preheated hydrogen is introduced at 39 and bubbles through the oil in the unobstructed oil filled space in the lower part of the tank, then penetrating through the porous bed and being withdrawn by the pipe 9.

Contact of the in-coming cold hydrogen gas with the walls of the heat interchanger 40 enables the gas to enter at an effective temperature and prevents chilling of the oil in contact with the hydrogen by contact with gas below the operating temperature.

Gas (and especially hydrogen gas) is a very poor conductor of heat and if it is entered cold into the oil, as by bubbling the the gas through oil in the presence of a catalyzer, the gas does not have an opportunity to heat up properly before it has traversed a considerable part or all of the depth of the body of oil. Suitable working temperatures for hydrogenating oils and fats in the presence of metallic catalyzers are 150° to 200° C., running higher in the case of certain oils which are not readily decomposed by such higher temperatures. The hydrogen is preferably introduced at as near the working temperature as possible.

The unabsorbed gas which is removed from the tank passes to the gasometer in a cooled condition, thus allowing the ready removal from the hydrogen, of the steam or other condensable product of the reaction which might otherwise affect the longevity of the catalyzer or retard its action.

It is not necessary to have the layer of porous catalytic material 43 at the top of the tower 1, but this, if desired, may be placed at the bottom thereof, preferably leaving space at the top to be filled with oil through which the gas may bubble in contact with a suspended catalyzer; which may be intentionally added, or which may be simply the mechanically removed particles from the catalyzer bed.

It is preferable that the bulk of hydrogen in the gasometer be always materially greater than the bulk of hydrogen in contact with the oil. I prefer to have at all times in the gasometers, at least five to ten times as much hydrogen as is present in the oil treating vessel. The hydrogen in this manner purifies itself, merely by standing. A drier may be located at 50, in the hydrogen inlet-connection.

If desired, hydrogen may be added to the system, either continuously or intermittently, for example through the pipe 25 in Fig. 1, or through the pipe 25 in Fig. 2, or otherwise.

While only two gasometers are shown in the drawings, obviously a larger number may be provided if desired.

As stated in my prior application Serial No. 711,745 filed July 26, 1912, the treating receptacles in which hydrogenation is carried on preferably should be lined with enamel or nickel or some material which has no anticatalytic action, as shown at 23.

The catalyzer employed herein may be any of the catalyzers suitable for effecting the hydrogenation of the oil, e. g. any of those employed in my U.S. Patents 1,154,495 or 1,217,118, although other suitable catalysts may be used.

I make no claim herein to the use of a relatively large movable body of hydrogen, and the autopurification of the same, that matter being claimed in my copending application 125,635 filed October 14, 1916.

The present application is in part a continuation of my prior application 808,461, filed December 23, 1913.

What I claim is:

1. In an apparatus for hydrogenating oily material and the like, the combination of a plurality of gas holders, means for passing the gas back and forth from any one of said holders to another, and for passing the same through a receptacle containing the oily material in the presence of catalyzer intermediate such holders, valves in the connecting pipes for directing the flow of the gas, and means for causing a flow of gas from one of such holders, through said receptacle into any of such gas holders.

2. In an apparatus for hydrogenating oily material and the like, the combination of a plurality of gas holders, means for passing the gas back and forth from any one of said holders to another, and for passing the same through a receptacle containing the oily material in the presence of catalyzer intermediate such holders, valves in the connecting pipes for directing the flow of the gas, and for drawing gas from any one of such holders and delivering the same to such receptacle containing oil, and means for withdrawing unabsorbed gas leaving such receptacle and delivering the same to any one of such gas holders.

3. The process of hydrogenating oil which comprises passing hydrogen-containing gas into and through a fatty oil under treatment, withdrawing uncombined gas from contact with the said oil, and effecting a transfer of heat units between the gas leaving the oil-treating receptacle and the gas entering said receptacle, whereby the heat of the outgoing gas is utilized, and the gas enters the oil at a temperature materially above ordinary atmospheric temperature.

4. In the apparatus for hydrogenating oily material and the like, the combination of a plurality of gas holders, means for passing the gas back and forth from either one of said holders to another, and for passing the same through a receptacle containing the oily material in the presence of catalyzer intermediate such holders, valves in the connecting pipes for directing the flow of the gas and a heat interchanger for transferring heat from the unabsorbed gas leaving such receptacle to the gas about to enter such receptacle.

5. In the hydrogenation of oil, the process herein described which comprises providing a bulk of oil in contact with a catalytic agent in an oil-treating vessel, and providing a volume of hydrogen for treating such oil, passing at least a material part of such volume of hydrogen into contact with such oil, and withdrawing and collecting the unabsorbed portion of such once-passed hydrogen in a container separate from that then supplying the hydrogen to the oil-treating vessel; thereafter separately passing at least a material part of such once-passed and non-absorbed portion of hydrogen again into contact with such oil, while withdrawing and collecting the portion of such twice-passed hydrogen which is not absorbed by the oil in such second passage, in a container separate from that containing such once-passed hydrogen; and thereafter repeating such separate passages of unabsorbed portions of hydrogen and such separate collections of the so passed and unabsorbed portions of hydrogen, each such collection being in a container separate from the one supplying hydrogen to the oil at that particular time, until the desired amount of hydrogenation of the oil has been effected.

6. In the hydrogenation of oil, the process herein described which comprises providing a bulk of oil in contact with a catalytic body, and providing a volume of hydrogen for treating such oil; passing such hydrogen through such oil and withdrawing and collecting the unabsorbed hydrogen separately from that which has not been in contact with the oil while effecting a transfer of heat units between the hydrogen so withdrawn and the hydrogen about to come into contact with such oil; then passing such unabsorbed portion again into contact with the oil while withdrawing and collecting the unabsorbed hydrogen by itself, and repeating such passages of withdrawn unabsorbed portions of hydrogen through such oil until the desired amount of hydrogenation has been effected.

7. In an apparatus for hydrogenating oily material and the like, the combination of a plurality of gas holders, means for passing the gas back and forth from any one of said holders to another, and for passing the same through a receptacle containing the oily material in the presence of catalyzer intermediate such holders, valves in the connecting pipes for directing the flow of the gas, and means for causing a flow of gas from each one of such holders through said receptacle into any other of such gas holders.

8. A process of treating an oily material comprising unsaturated constituents, which comprises passing a body of hydrogen gas, to and fro, between a plurality of gas holders, and causing the said gas to come into contact with said oily material, in the presence of a catalyst, intermediate said holders.

In testimony whereof I affix my signature.

CARLETON ELLIS.